US008711067B2

(12) United States Patent
Joffer et al.

(10) Patent No.: US 8,711,067 B2
(45) Date of Patent: Apr. 29, 2014

(54) PIXEL INTERLEAVING CONFIGURATIONS FOR USE IN HIGH DEFINITION ELECTRONIC SIGN DISPLAYS

(75) Inventors: Brent A. Joffer, Brookings, SD (US); Brett David Wendler, Watertown, SD (US); Glenn P. Luke, Brookings, SD (US); Nathan Lane Nearman, Brookings, SD (US); Chad Neal Gloege, Brookings, SD (US); Matthew Ray Mueller, Brookings, SD (US); Shannon Lee Mutschelknaus, Aurora, SD (US); Joseph Gerard Schulte, Brookings, SD (US); Eric Steven Bravek, Brookings, SD (US); Ryan Mark Hansen, Watertown, SD (US)

(73) Assignee: Daktronics, Inc., Brookings, SD (US)

( * ) Notice: Subject to any disclaimer, the term of this patent is extended or adjusted under 35 U.S.C. 154(b) by 5 days.

(21) Appl. No.: 13/547,312

(22) Filed: Jul. 12, 2012

(65) Prior Publication Data

US 2012/0274675 A1 Nov. 1, 2012

Related U.S. Application Data

(63) Continuation of application No. 13/359,095, filed on Jan. 26, 2012, now Pat. No. 8,269,700, which is a continuation of application No. 12/217,011, filed on Jul. 1, 2008, now Pat. No. 8,130,175, which is a continuation-in-part of application No. 11/786,720, filed on Apr. 12, 2007, now Pat. No. 7,907,133.

(51) Int. Cl.
*G09G 5/00* (2006.01)

(52) U.S. Cl.
USPC ............... 345/83; 345/204; 345/76; 40/581; 40/542

(58) Field of Classification Search
USPC ............... 345/76–83, 204, 44–46, 690–699, 345/87–89, 212; 40/541–607.15
See application file for complete search history.

(56) References Cited

U.S. PATENT DOCUMENTS

| 3,291,975 A | 12/1966 | Mccullough |
| 3,594,761 A | 7/1971 | Boesen |
| 4,234,914 A | 11/1980 | Boesen |
| 4,659,876 A | 4/1987 | Sullivan et al. |
| 5,020,253 A | 6/1991 | Lie et al. |

(Continued)

FOREIGN PATENT DOCUMENTS

| EP | 1202162 A1 | 5/2002 |
| EP | 1699036 A1 | 9/2006 |
| JP | 20050275178 A | 10/2005 |
| WO | WO-9108565 A1 | 6/1991 |

OTHER PUBLICATIONS

"U.S. Appl. No. 11/271,404, Non-Final Office Action mailed Apr. 13, 2009", 4 pgs.

(Continued)

*Primary Examiner* — Lun-Yi Lao
*Assistant Examiner* — Priyank Shah
(74) *Attorney, Agent, or Firm* — Schwegman, Lundberg & Woessner, P.A.

(57) ABSTRACT

Pixel interleaving configurations for use in high definition electronic sign displays where each and every scan line includes full red, green, and blue color representation to provide for high resolution electronic video sign displays.

16 Claims, 11 Drawing Sheets

(56) References Cited

U.S. PATENT DOCUMENTS

| | | | |
|---|---|---|---|
| 5,027,112 | A | 6/1991 | Ross et al. |
| 5,132,674 | A | 7/1992 | Bottorf |
| 5,184,116 | A | 2/1993 | Daugherty et al. |
| 5,198,723 | A | 3/1993 | Parker |
| 5,268,828 | A | 12/1993 | Miura |
| 5,321,417 | A | 6/1994 | Voelzke et al. |
| 5,353,536 | A | 10/1994 | Erber et al. |
| 5,410,328 | A | 4/1995 | Yoksza et al. |
| 5,559,529 | A | 9/1996 | Maher |
| 5,617,657 | A | 4/1997 | Kahn |
| 5,743,610 | A | 4/1998 | Yajima et al. |
| 5,759,044 | A | 6/1998 | Redmond |
| 5,949,581 | A | 9/1999 | Kurtenbach et al. |
| 6,309,074 | B1 | 10/2001 | Inbar et al. |
| 6,314,669 | B1 | 11/2001 | Tucker |
| 6,329,593 | B1 | 12/2001 | Yang |
| 6,414,650 | B1 | 7/2002 | Nicholson et al. |
| 6,661,429 | B1 | 12/2003 | Phan |
| 6,677,918 | B2 | 1/2004 | Yuhara et al. |
| 6,691,443 | B1 | 2/2004 | Slayden |
| D487,779 | S | 3/2004 | Rose |
| 6,705,033 | B1 | 3/2004 | Greene et al. |
| 6,729,054 | B1 | 5/2004 | VanderTuin |
| 6,737,983 | B1 | 5/2004 | Temple |
| 6,741,222 | B1 | 5/2004 | Tucker |
| 6,813,853 | B1 | 11/2004 | Tucker |
| 6,816,389 | B1 | 11/2004 | Lutz et al. |
| 6,831,653 | B2 | 12/2004 | Kehlet et al. |
| 6,926,375 | B2 | 8/2005 | Nagamine et al. |
| 6,966,674 | B2 | 11/2005 | Tsai |
| 6,994,448 | B1 | 2/2006 | Gorrell |
| 7,014,916 | B2 | 3/2006 | Tanabe |
| 7,050,024 | B2 | 5/2006 | LeChevalier |
| 7,055,271 | B2 | 6/2006 | Lutz et al. |
| D526,361 | S | 8/2006 | Yasuoka et al. |
| 7,344,902 | B2 | 3/2008 | Basin et al. |
| 7,355,562 | B2 | 4/2008 | Schubert et al. |
| 7,907,133 | B2 | 3/2011 | Joffer et al. |
| 7,916,156 | B2 | 3/2011 | Brown Elliott et al. |
| 7,928,968 | B2 | 4/2011 | Shon et al. |
| 7,969,456 | B2 | 6/2011 | Brown Elliott et al. |
| 8,130,175 | B1 | 3/2012 | Joffer et al. |
| 8,172,097 | B2 | 5/2012 | Nearman et al. |
| 8,269,700 | B2 | 9/2012 | Joffer et al. |
| 8,350,788 | B1 | 1/2013 | Nearman et al. |
| 2002/0059742 | A1 | 5/2002 | Okazaki et al. |
| 2002/0140655 | A1 | 10/2002 | Liang et al. |
| 2003/0058191 | A1 | 3/2003 | Yuhara et al. |
| 2003/0217495 | A1 | 11/2003 | Nagamine et al. |
| 2004/0046721 | A1 | 3/2004 | Yang |
| 2004/0130536 | A1 | 7/2004 | Tanabe |
| 2004/0150651 | A1* | 8/2004 | Phan ............... 345/589 |
| 2004/0164936 | A1* | 8/2004 | Lim ............... 345/76 |
| 2005/0081414 | A1 | 4/2005 | Lutz et al. |
| 2005/0259418 | A1 | 11/2005 | Callegari et al. |
| 2006/0055642 | A1* | 3/2006 | Daughenbaugh et al. ...... 345/82 |
| 2006/0092162 | A1 | 5/2006 | Deering et al. |
| 2006/0105485 | A1 | 5/2006 | Basin et al. |
| 2006/0232525 | A1 | 10/2006 | Chou |
| 2008/0048200 | A1 | 2/2008 | Mueller et al. |
| 2008/0078733 | A1 | 4/2008 | Nearman et al. |
| 2008/0141570 | A1 | 6/2008 | Nearman et al. |
| 2008/0225143 | A1 | 9/2008 | Joffer et al. |
| 2011/0163942 | A1 | 7/2011 | Joffer et al. |
| 2011/0175888 | A1 | 7/2011 | Joffer et al. |
| 2012/0119980 | A1 | 5/2012 | Joffer et al. |

OTHER PUBLICATIONS

"U.S. Appl. No. 11/271,404, Preliminary Amendment filed Nov. 10, 2005", 11 pgs.
"U.S. Appl. No. 11/271,404, Response filed Jan. 7, 2009 to Restriction Requirement mailed Jan. 2, 2009", 12 pgs.
"U.S. Appl. No. 11/271,404, Restriction Requirement filed Jan. 2, 2009", 5 pgs.
"U.S. Appl. No. 11/642,221, Final Office Action mailed Dec. 17, 2009", 6 pgs.
"U.S. Appl. No. 11/642,221, Non-Final Office Action mailed Mar. 16, 2009", 5 pgs.
"U.S. Appl. No. 11/642,221, Notice of Allowance mailed Nov. 28, 2011", 7 pgs.
"U.S. Appl. No. 11/642,221, Preliminary Amendment mailed Feb. 28, 2007", 9 pgs.
"U.S. Appl. No. 11/642,221, Response filed Apr. 15, 2010 to Final Office Action mailed Dec. 17, 2009", 10 pgs.
"U.S. Appl. No. 11/642,221, Response filed Aug. 10, 2009 to Non Final Office Action mailed Mar. 16, 2009", 9 pgs.
"U.S. Appl. No. 11/786,720, Non-Final Office Action mailed Jun. 24, 2010", 9 pgs.
"U.S. Appl. No. 11/786,720, Notice of Allowance mailed Nov. 16, 2010", 6 pgs.
"U.S. Appl. No. 11/786,720, Preliminary Amendment filed Mar. 18, 2008", 12 pgs.
"U.S. Appl. No. 11/786,720, Preliminary Amendment filed Nov. 9, 2009", 10 pgs.
"U.S. Appl. No. 11/786,720, Response filed Sep. 24, 2010 to Non Final Office Action mailed Jun. 24, 2010", 10 pgs.
"U.S. Appl. No. 12/217,003 , Response filed Jun. 29, 2012 to Final Office Action mailed Jan. 6, 2012", 17 pgs.
"U.S. Appl. No. 12/217,003, Final Office Action mailed Jan. 6, 2012", 26pgs.
"U.S. Appl. No. 12/217,003, Non Final Office Action mailed Aug. 5, 2011", 23 pgs.
"U.S. Appl. No. 12/217,003, Preliminary Amendment filed Sep. 2, 2008", 3 pgs.
"U.S. Appl. No. 12/217,003, Response filed Oct. 14, 2011 to Non Final Office Action mailed Aug. 5, 2011", 17 pgs.
"U.S. Appl. No. 12/217,011, Non Final Office Action mailed Aug. 10, 2011", 13 pgs.
"U.S. Appl. No. 12/217,011, Notice of Allowance mailed Oct. 27, 2011", 8 pgs.
"U.S. Appl. No. 12/217,011, Preliminary Amendment filed Sep. 2, 2008", 6 pgs.
"U.S. Appl. No. 12/217,011, Response filed Oct. 7, 2011 to Non Final Office Action mailed Aug. 10, 2011", 8 pgs.
"U.S. Appl. No. 13/047,193, Final Office Action mailed Nov. 25, 2011", 15 pgs.
"U.S. Appl. No. 13/047,193, Non Final Office Action mailed Aug. 30, 2011", 15 pgs.
"U.S. Appl. No. 13/047,193, Response filed Nov. 1, 2011 to Non Final Office Action mailed Aug. 30, 2011", 15 pgs.
"U.S. Appl. No. 13/076,857 , Response filed Jan. 23, 2012 to Final Office Action mailed Nov. 10, 2011", 13 pgs.
"U.S. Appl. No. 13/076,857, Final Office Action mailed Nov. 10, 2011", 17 pgs.
"U.S. Appl. No. 13/076,857, Non Final Office Action mailed Aug. 22, 2011", 17 pgs.
"U.S. Appl. No. 13/076,857, Response filed Nov. 1, 2011 to Non Final Office Action mailed Aug. 22, 2011", 15 pgs.
"U.S. Appl. No. 13/359,095, Notice of Allowance mailed Apr. 12, 2012", 10 pgs.
"European Application Serial No. 07882836.9, Supplementary European Search Report mailed Feb. 7, 2012", 6 pgs.
"European Application Serial No. 08742865.2, Communication pursuant to Rules 70(2) and 70a(2) EPC dated Aug. 23, 2010", 1 pg.
"European Application Serial No. 08742865.2, Extended European Search Report mailed Aug. 4, 2010", 7 pgs.
"European Application Serial No. 08742865.2, Response filed Feb. 23, 2011 to Communication dated Aug. 23, 2010", 13 pgs.
"International Application Serial No. PCT/US06/36683, International Preliminary Report on Patentability completed Oct. 10, 2008", 6 pgs.
"International Application Serial No. PCT/US06/36683, International Search Report mailed Aug. 9, 2007", 1 pg.
"International Application Serial No. PCT/US06/36683, Written Opinion mailed Aug. 9, 2007", 4 pgs.
"International Application Serial No. PCT/US07/25456, International Search Report mailed Apr. 16, 2008", 1 pg.

(56) References Cited

OTHER PUBLICATIONS

"International Application Serial No. PCT/US07/25456, Written Opinion mailed Apr. 16, 2008", 4 pgs.
"International Application Serial No. PCT/US08/04808, International Search Report mailed Jul. 30, 2008", 2 pgs.
"InternationalApplication Serial No. PCT/US08/04808, Written Opinion mailed Jul. 30, 2008", 4 pgs.
"U.S. Appl. No. 12/217,003, Notice of Allowance mailed Aug. 31, 2012", 8 pgs.
"U.S. Appl. No. 13/047,193, Non Final Office Action mailed Sep. 28, 2012", 13 pgs.
"U.S. Appl. No. 13/076,857, Non Final Office Action mailed Aug. 20, 2012", 17 pgs.
"U.S. Appl. No. 13/047,193, Response filed Jul. 29, 2013 to Final Office Action mailed May 30, 2013", 12 pgs.
"U.S. Appl. No. 13/047,193, Advisory Action mailed Aug. 8, 2013", 3 pgs.
"U.S. Appl. No. 13/047,193, Final Office Action mailed May 30, 2013", 14 pgs.
"U.S. Appl. No. 13/047,193, Response filed Jan. 17, 2013 to Non Final Office Action mailed Sep. 28, 2012", 13 pgs.
"U.S. Appl. No. 13/047,193, Response filed Feb. 1, 2012 to Final Office Action mailed Nov. 25, 2011", 14 pgs.
"U.S. Appl. No. 13/076,857, Final Office Action mailed May 23, 2013", 22 pgs.
"U.S. Appl. No. 13/076,857, Response filed Jan. 10, 2013 to Non-Final Office Action mailed Aug. 20, 2012", 15 pgs.

* cited by examiner

PIXEL INTERLEAVING CONFIGURATIONS FOR USE IN HIGH DEFINITION ELECTRONIC SIGN DISPLAYS

CROSS REFERENCES TO RELATED APPLICATIONS

This application is a continuation of and claims the benefit of priority under 35 U.S.C. §120 to U.S. patent application Ser. No. 13/359,095 filed on Jan. 26, 2012, entitled "Pixel Interleaving Configurations For Use In High Definition Electronic Sign Displays," which is pending, which is a continuation of and claims the benefit of priority under 35 U.S.C. §120 to U.S. patent application Ser. No. 12/217,011 filed on Jul. 1, 2008, entitled "Pixel Interleaving Configurations For Use In High Definition Electronic Sign Displays," issued as U.S. Pat. No. 8,130,175 on Mar. 6, 2012, which is a continuation-in-part (CIP) of U.S. patent application Ser. No. 11/786,720 filed on Apr. 12, 2007, issued as U.S. Pat. No. 7,907,133 on Mar. 15, 2011, entitled "Pixel Interleaving Configuration for Use in High Definition Electronics Sign Displays," the benefit of priority of each of which is claimed hereby, and each of which are incorporated by reference herein in its entirety.

This patent application is related to patent application Ser. No. 11/642,221 filed on Dec. 20, 2006, entitled "LED Display Module", which is pending, and which is a continuation of patent application Ser. No. 11/271,404 filed Nov. 10, 2005, entitled "Modular Display System", which is pending.

BACKGROUND OF THE INVENTION

1. Field of the Invention

The present invention to electronic sign displays and, more particularly relates to pixel interleaving configurations for use in high definition electronic sign displays.

2. Description of the Prior Art

Prior art electronic sign displays have often incorporated a plurality of light emitting diodes (LEDs) as a prime emitter of light or points of light, whereby visual perception is processed by the eye of a viewer as a graphic presentation. Electronic sign displays have evolved from those having moderate resolution to those having an improved degree of resolution approaching or equaling high definition video, such as brought on by the advent of high definition (HD) television devices. There is a desire for high definition, i.e., high resolution, indoor or outdoor LED displays reflecting the current trend in the ever increasing quest for picture-like HD video quality. There are two primary standards for HD video, one is 720p and the other is 1080i. The 720p standard uses 720 progressively scanned lines of multiple pixel groups of full color red, green and blue (RGB) LEDs, where each RGB LED group constitutes a single pixel that collectively create a video image frame for accumulated perception as an image by the human eye. For example, a progressive scan could use 1/60th of a second for each frame. The other standard is the 1080i standard, that supports 1080 lines of resolution by interleaved scanning. In interleaved scanning, the odd lines are illuminated for 1/60th of a second followed by the even scan lines for 1/60th of a second, giving a full frame of data in 1/30th of a second. Each video standard is independent of the light emitting technology, and therefore can be supported by CRT (cathode ray tube), LCD (liquid crystal displays), plasma, or LEDs (light emitting diodes). Light emitting diode displays are often the preferred technology for large video displays because they are capable of creating a high contrast, bright display. Producing such high resolution light emitting displays requires the addition of LEDs where the quantity of LEDs are increased in great quantity to achieve desired clarity, resolution, definition and brightness. Because every pixel in those lines of resolution has a red, green, and blue component associated with it, every pixel should have a red, green, and blue LED to display all the video information available for that pixel element. LEDs are a very significant percentage of the cost of an LED screen, and therefore, a screen with 720 pixels high by some arbitrary number of pixels wide can be extremely expensive and, therefore, cost prohibitive for many users. Such an increase in the number of LEDs required for high definition resolution use can be problematic in terms of LED cost and in terms of energy usage. Size limitations are also a cause of concern. There are two approaches with respect to LED structuring when building a high definition electronic sign display. One approach uses a plurality of individual LEDs where each LED is an individual colored red, green, and blue LED, thereby forming a pixel. The physical size of these lamps along with the requirement to have at least three LEDs (red, green, and blue) limits how tightly the spacing can be between full color pixel elements. Alternatively, these lamp-style LEDs can be inserted through the circuit board as part of an LED package directly affixed to the face of the circuit board. This second approach is a surface mount device (SMD) package that preferably includes red, green, and blue LEDs in one package. Combining all three color diodes into such a single SMD LED package allows for tighter pixel spacing and is limited only by the size of the SMD package itself. In addition to typical video format displays, there are many applications pertaining to vertically small but very long displays. Some examples of these applications include financial ticker displays, or programmable electronic advertising displays, such as Daktronics, Inc. ProAd® product often found in stadiums and arenas. These displays are often between 1-4 feet tall, but can be tens or even hundreds of feet long. Vertical pixel resolution has a significant impact on the image quality of these displays and is beneficial to advertisers who want a high quality image when they are paying to advertise their product/company through the use of such a device. Clearly what is desired is a solution addressing the shortcomings of prior art devices where such a solution is introduced by the present invention.

SUMMARY OF THE INVENTION

The general purpose of the present invention is to provide pixel interleaving configurations for use in high definition electronic sign displays. The invention includes one or more red, green, and blue LED pixel configurations that are useful for optimizing the vertical resolution of LED video displays, especially high definition electronic sign displays. The following are key features or attributes of the invention:

1. Any pixel has at least 1 red, 1 green, and 1 blue (RGB) light emitting diode to form a full color element, but may be in different or varying configurations or native pixel arrangements, such as, but not limited to, the following basic configurations, whereby a pixel includes either: (a) individual LEDs including a grouping preferably of at least one red LED, one green LED, and one blue LED elements consisting of solely vertical LED alignment or consisting of triangular alignment or any other suitable arrangement; or (b) SMD (Surface Mount Device) LED packages of multiple elements including one red LED, one green LED, and one blue LED being closely grouped therein preferably in chevron (triangular alignment) style or other suitable arrangement.

2. There are odd and even lines of pixels. The even lines are horizontally offset from the odd lines to allow for tighter vertical pixel spacing while using either three individual (separate) red, green, blue LEDs or while using SMD LED packages according to 1. above.

3. The LED spacing within an individual LED (red, green, blue) style pixel or spacing from pixel-to-pixel can be flexible. Spacing of the LEDs may be compacted within the pixel to ease manufacturing and, as such, pixel boundaries can easily be visually seen and identified), or uniform spacing can be used to create an even fill-factor across the LED sign where the pixel boundaries blend together, preferably making it difficult to visually identify which individual LEDs belong with which pixel.

4. Pixel arrangements are scaleable as the pixel pitch between interleaved 3-in-1 SMD LED package pixels or separate red, green, blue SMD pixels is not limited to designs at 4 mm, 12.5 mm, 25 mm and the like, but can be implemented on any pitch between the pixels. This scaleability allows this invention to be used to develop a family of devices with a wide ranging offering of pixel spacing that can be used to build a sign format with the optimal viewing properties for any display applications.

According to one or more embodiments of the present invention, there are provided pixel interleaving configurations for use in high definition electronic sign displays where each scanned pixel includes a full complement of colored LEDs including the colors of red, green, and blue.

One significant aspect and feature of the present invention is an interleaved display where each scanned pixel includes red, green, and blue representation.

Another significant aspect and feature of the present invention is the offset of a succeeding line of pixels with a previous line of pixels.

Still another significant aspect and feature of the present invention is the reduction in the number of LEDs required in an electronic sign display by the use of interleaving of pixels while still maintaining a balanced and full red, green, and blue color representation in each scan row, often referred to as full color rows of resolution.

Yet another significant aspect and feature of the present invention is the use of pure pixel display concepts instead of virtual or dynamic pixeling.

A further significant aspect and feature of the present invention is the use of full color row resolution which does not experience color shift, which upholds high image and color quality, and which maintains high definition capabilities.

A still further significant aspect and feature of the present invention is that full color pixel content is provided for even use of the LEDs, whereby all LEDs age at an even rate.

A still further significant aspect and feature of the present invention decreases LED density while maintaining the number of full color resolution rows.

A further significant aspect and feature of the present invention prevents side angle color shift that occurs when LEDs are packed very closely together.

Having thus briefly described embodiments of the present invention and having mentioned some significant aspects and features of the present invention, it is the principal object of the present invention to provide pixel interleaving configurations for use in high definition electronic sign displays.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
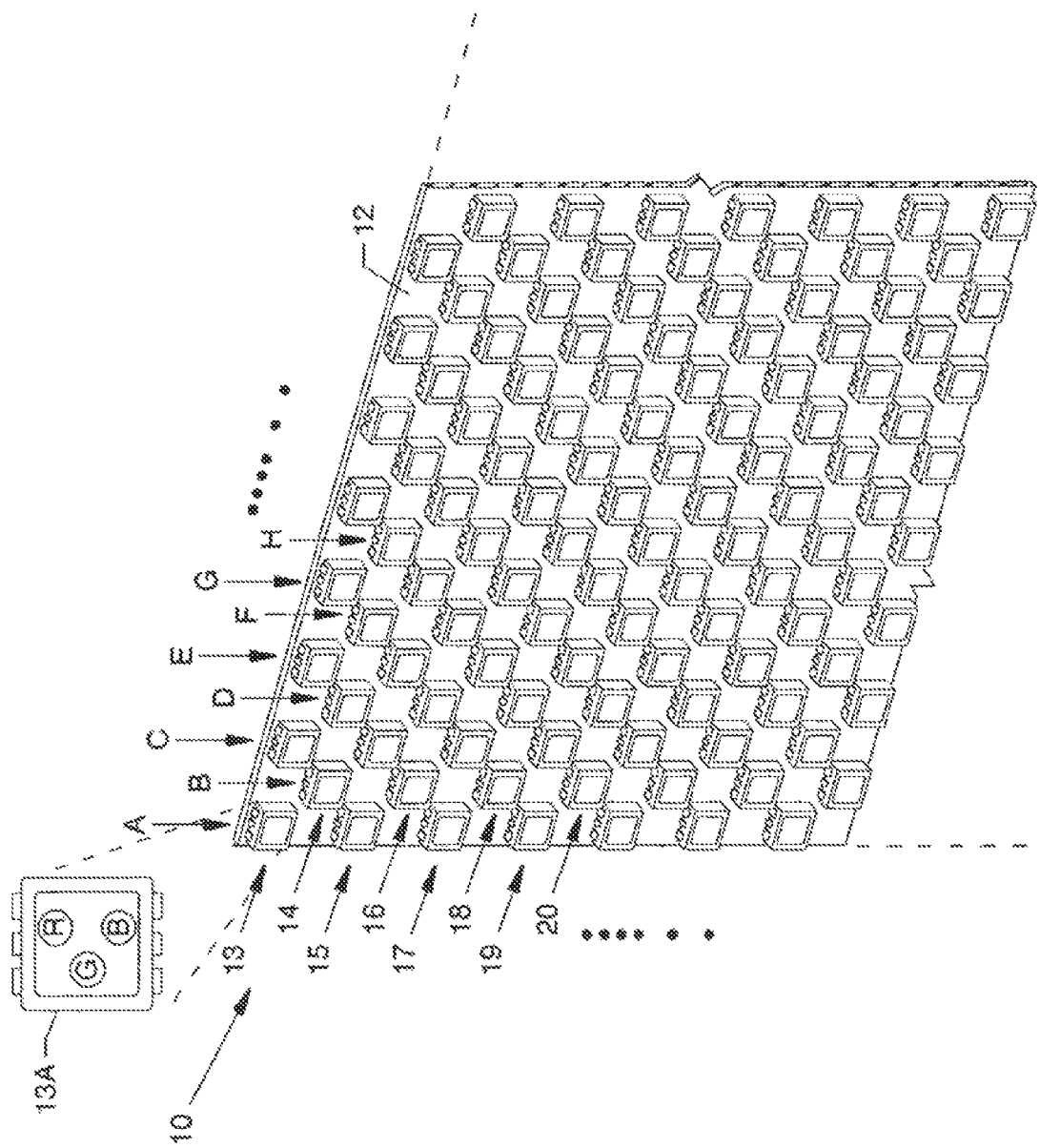
FIG. 1 is a segmented view showing a pixel interleaving configuration for use in high definition electronic sign displays, the present invention.

FIG. 1 is a segmented view showing a pixel interleaving configuration 10 for use in high definition electronic sign displays where a plurality of LED packages are arranged and mounted on a circuit board 12 which can be part of a high definition electronic sign display. The LED packages, each of which are a pixel, are arranged in alternating style having odd numbered rows 13, 15, 17, 19, and so on, alternating with even numbered rows 14, 16, 18, 20, and so on, where the even numbered rows 14, 16, 18, 20, and so on, are offset from the odd numbered rows 13, 15, 17, 19, and so on. Correspondingly, the LED packages are arranged in alternating style having columns A, C, E and G, and so on, alternating with columns B, D, F, H, and so on, where the columns B, D, F and H are offset from the columns A, C, E and G, and so on. The LED packages can be identified according to row and column. For example, the upper left LED package would be LED package 13A, the LED package beneath would be LED package 15A, and so on. An enlarged copy of the LED package 13A is shown distanced from the other LED packages. The LED package 13A and each of the other similar LED packages are a pixel, each including LED elements which can be generally smaller than individual LEDs which are a red LED, a green LED, and a blue LED indicated by the letters R, G and B arranged in chevron or triangular style or other suitable style.

Figure 2:
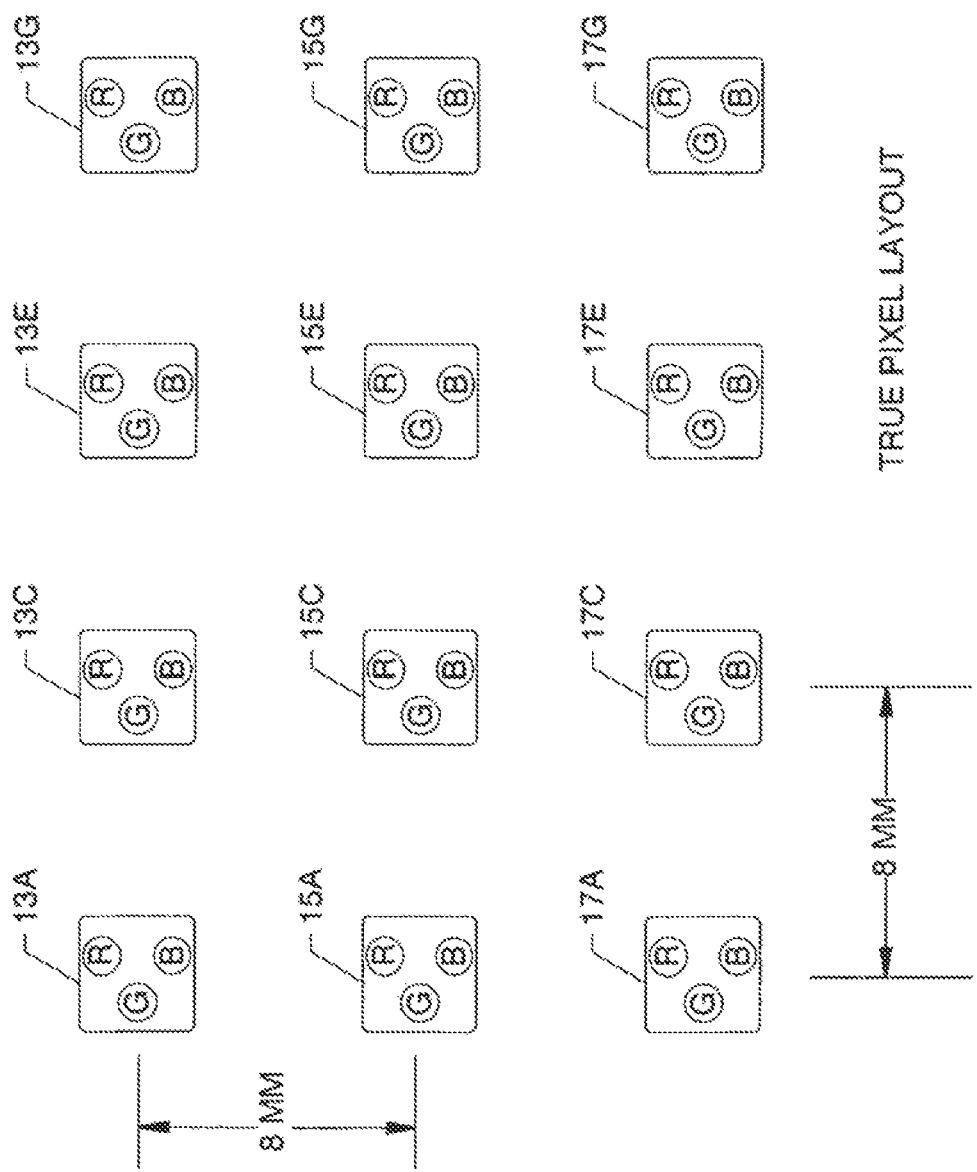
FIG. 2 and FIG. 3 are an overview demonstrating the concept of interleaving of pixels showing the use of LED packages (pixels) such as described and arranged in FIG. 1.
Figure 3:
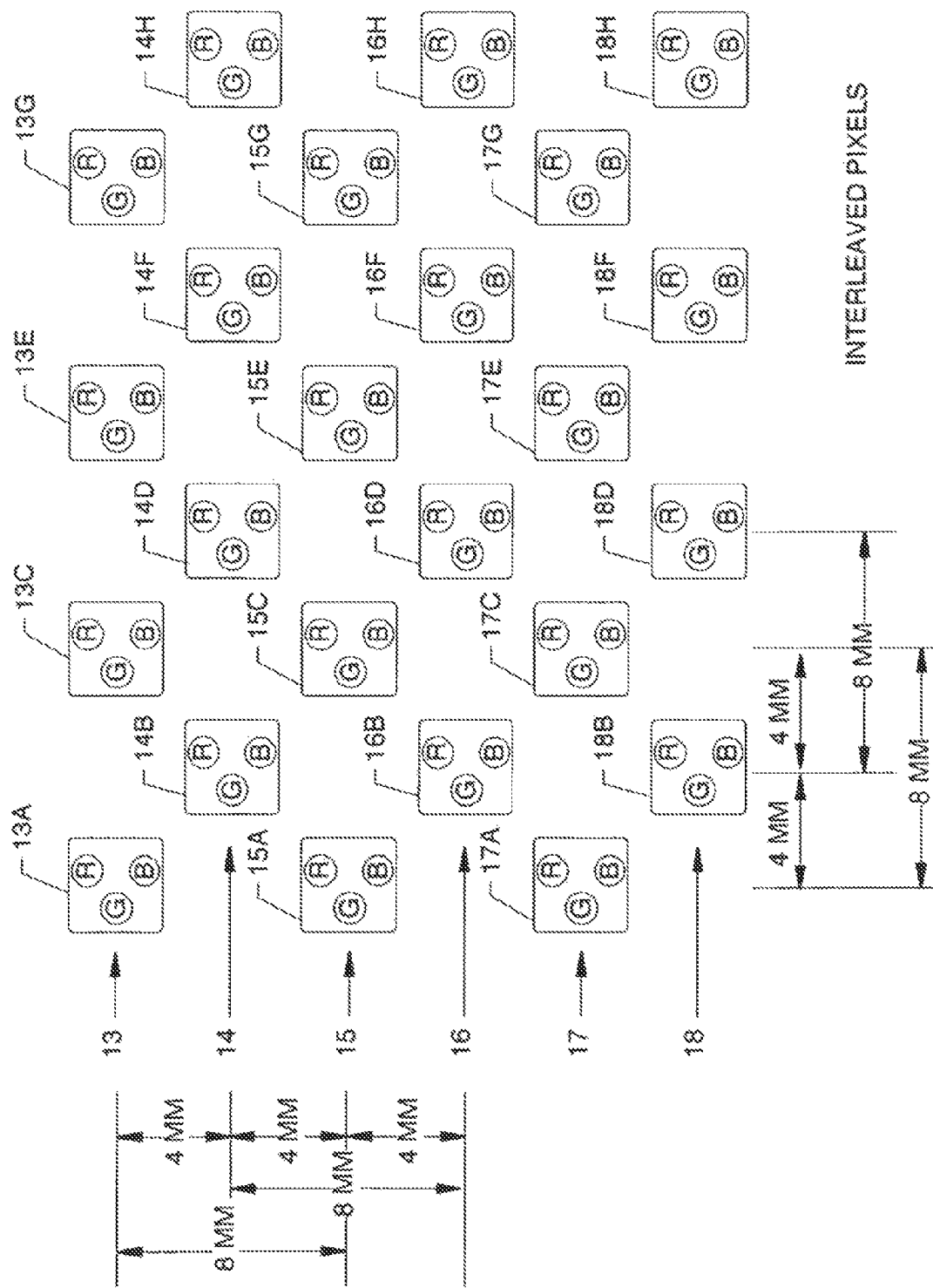
Figure 4:
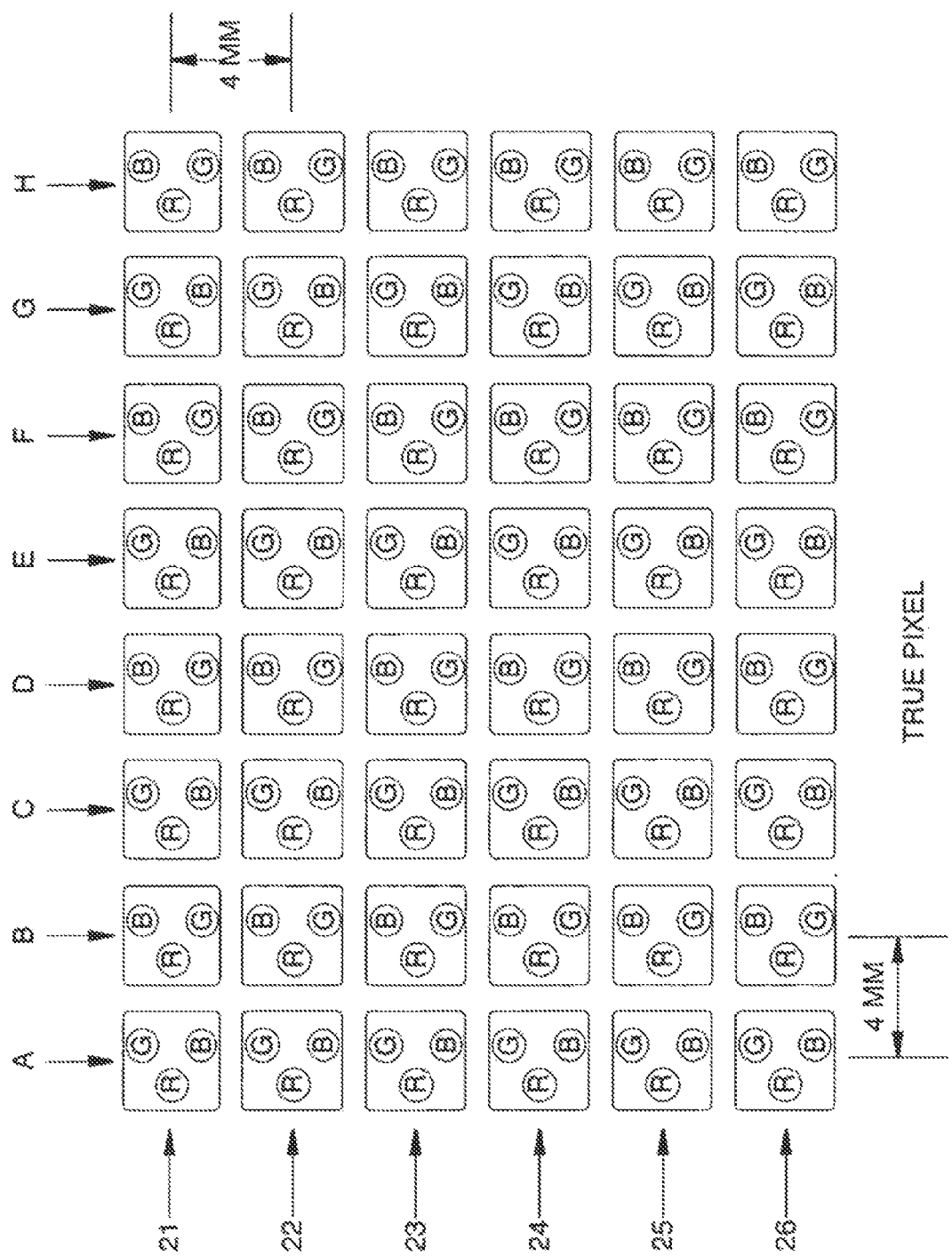
FIG. 4 shows LED packages (pixels) arranged in true pixel configuration.

FIG. 2 and FIG. 3 are used for an overview demonstrating the concept of interleaving pixels showing the use of LED packages (pixels), such as described and arranged in FIG. 1. For example, and as in FIG. 2, starting with a true pixel layout, LED packages 13A, 13C, 13E, 13G, 15A, 15C, 15E, 15G, 17A, 17C, 17E, and 17G are distributed with the center of each aligned on vertical and horizontal 8 mm centers, thus creating pixels spaced at 8 mm. A proportionate number of additional pixels 14B, 14D, 14F, 14H, 16B, 16D, 16F, 16H,

18B, 18D, 18F and 18H (FIG. 3) are then interleavingly distributed in uniform fashion as shown in FIG. 3, substantially between or suitably spaced as illustrated with reference to LED packages 13A, 13C, 13E, 13G, 15A, 15C, 15E, 15G, 17A, 17C, 17E, and 17G in alignment with other and additional offset vertical and horizontal 8 mm centers resulting in another 8 mm spaced interleaved pixel arrangement, where the term "pixel interleaving" or "interleaved" is in preferred use by Daktronics, Inc. of Brookings, S. Dak. More precisely, LED package 14B is centrally located in the space below LED packages 13A and 13C and above LED packages 15A and 15C, the LED package 16B is centrally located in the space below LED packages 15A and 15C and above LED packages 17A and 17C, and so on in the same fashion. Other LED packages are not shown for the purpose of brevity and clarity. Such an arrangement of LED packages (pixels) results in an interleaved arrangement of LED packages (pixels) with 4 mm vertical and horizontal spacing. By using positional pixel processing, that processes the signal in relation to the location of the pixel, the colors blend with their own pixel but the viewer's eyes also blend with the color produced by a neighboring pixel. With this type of interleaved layout combined with positional pixeling technology, which can also be referred to as "pure pixel", a term which is in preferred use by Daktronics, Inc. of Brookings, S. Dak., each and every pixel and, therefore, each and every scan line is full color resulting in a blend of efficiency and accuracy having the capability to reproduce all the color depth and detail present in the original image signal. In the illustration provided by FIG. 3, 24 LED packages using interleaved "pure pixel" design are used, whereas 48 LED packages are used in the illustration provided in FIG. 4 using a non-interleaved "true pixel" design, a term which is in preferred use by Daktronics, Inc. of Brookings, S. Dak., obviously providing an economical solution to pixel quantity where, in FIG. 4, LED packages (pixels) are shown arranged in rows 21 through 26 and columns A through H. Such economy is more significant when comparing larger high definition electronic sign displays. For example, such an interleaving using the 4 mm interleaved pixel spacing of FIG. 3 requires 3,906 LED packages using interleaved pixel design to populate a one square meter high definition electronic sign display which, significantly, is half of the 7,812 LED packages required to populate a "true pixel" high definition electronic sign display represented in FIG. 4 having 4 mm pixel spacing. Such interleaved configurations can be scaled to larger spacings. For instance, larger LED packages (pixels) having correspondingly larger LEDs or individual red, green, and blue LEDs in groups (pixels) can be scaled upwardly to include, for example, 8 mm, 12.5 mm, 16 mm and the like. For example, a pure pixel (interleaved) design having 12.5 mm spacing using individual LEDs would require the use of 3200 red LEDs, 3200 green LEDs, and 3200 blue LEDs to populate a one square meter high definition electronic sign display, whereas a "true pixel" design having 12.5 mm spacing would required the use of 6400 red LEDs, 6400 green LEDs, and 6400 blue LEDs to populate a one square meter high definition electronic sign display.

Figure 5:
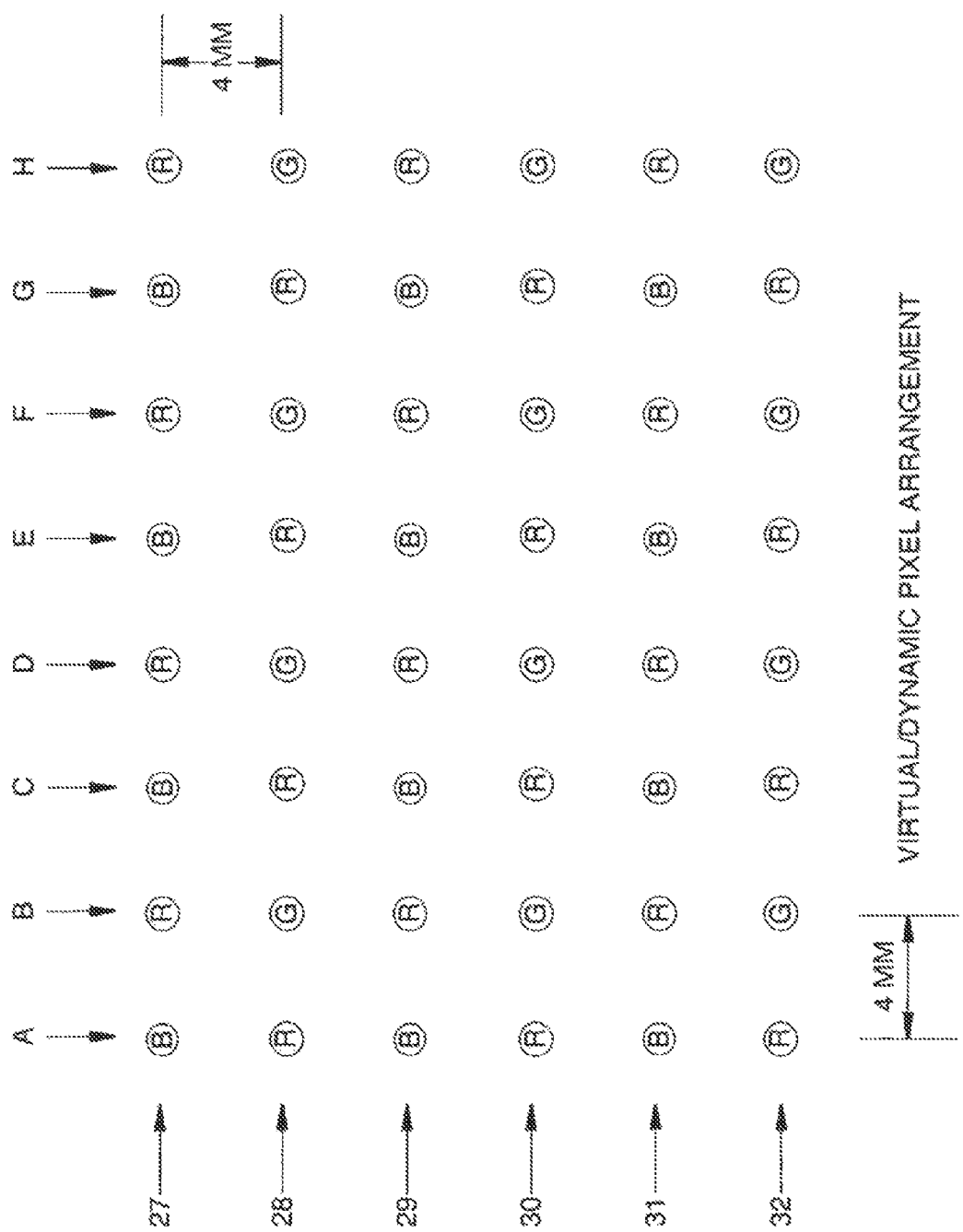
FIG. 5 for the sake of comparison shows a prior art virtual/dynamic pixel arrangement incorporating single colored LEDs which form pixels accounted for in various configuration designations such as known in the art.

For comparison, FIG. 5 shows a prior art virtual/dynamic pixel arrangement incorporating single colored LEDs which form pixels which can be accounted for in various configuration designations, such as known in the art where single colored LEDs are arranged in rows 27 through 32 and columns A through H of 4 mm vertical and horizontal spacing. Use of the interleave pixel spacing as described in FIG. 3 provides for scans involving the availability of red, green, and blue elements for use in each scan line. For example, a scan of line 13 of FIG. 3 involves the availability of four red LED elements, four green LED elements, and four blue LED elements of the LED packages 13A, 13C, 13E and 13G, whereas a scan of a corresponding line 27 of FIG. 5 involves the availability of four red LEDs, zero green LEDs, and four blue LEDs where green LEDs are under-represented, i.e., nonexistent. In a similar fashion, a scan of line 14 of FIG. 3 involves the availability of four red LED elements, four green LED elements, and four blue LED elements of the LED packages 14B, 14D, 14F and 14H, whereas a scan of a corresponding line 28 of FIG. 5 involves the availability of four red LEDs, four green LEDs, and zero blue LEDs where blue LEDs are under-represented, i.e., nonexistent. Additional following scan patterns repeatedly exhibit the same characteristics where a shortage of green and blue color representation exists with reference to the scan lines of the virtual/dynamic pixel arrangement shown in FIG. 5 and where, preferably, an even and balanced red, green, and blue color representation exists with reference to the scan lines of the interleaved pixel arrangement shown in FIG. 3. It is noted that the interleaved pixel arrangement of FIG. 3, like the "true pixel" arrangement of FIG. 4, includes scan lines of full color representation.

Figure 6:
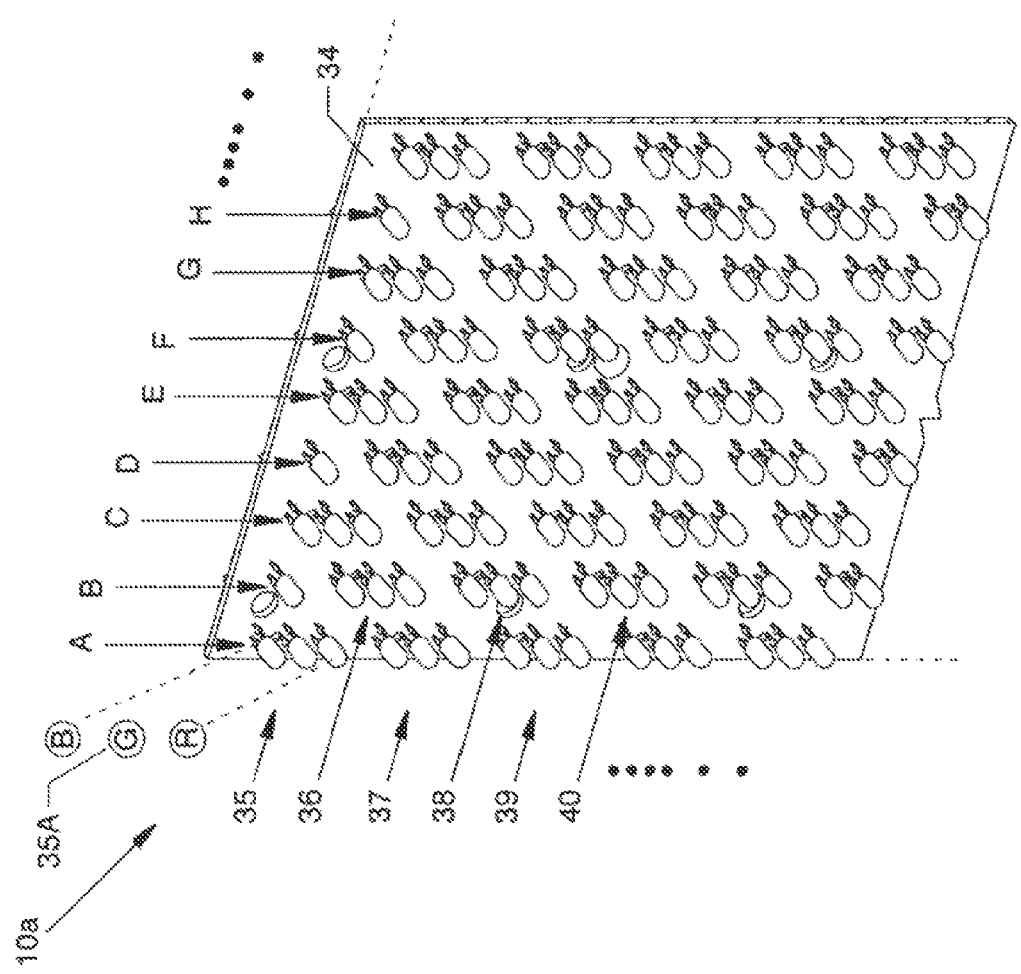
FIG. 6 is a segmented view showing a pixel interleaving configuration for use in high definition electronic sign displays where a plurality of individual LEDs form pixels.

FIG. 6 is a segmented view showing a pixel interleaving configuration 10a for use in high definition electronic sign displays where a plurality of individual LEDs form pixels which are arranged for use on a circuit board 34 which can be part of a high definition electronic sign display. Each pixel consists of an individual red LED, an individual green LED, and an individual blue LED in vertical alignment where the pixels are arranged in alternating style having odd numbered rows 35, 37, 39 and so on alternating with even numbered rows 36, 38, 40 and so on where the even numbered rows 36, 38, 40 are offset from the odd numbered rows 35, 37, 39. Correspondingly, the pixels are arranged in alternating style having columns A, C, E, G and so on alternating with columns B, D, F, H and so on where the columns B, D, F, H are offset with respect to the columns A, C, E, G, whereby the pixels can be identified according to row and column. For example, the upper left pixel would be pixel 35A, the pixel beneath would be pixel 37A and so on. An enlarged copy of the pixel 35A is shown distanced from the other pixels. The pixel 35A and each of the other pixels are similar in construction.

Figure 7:
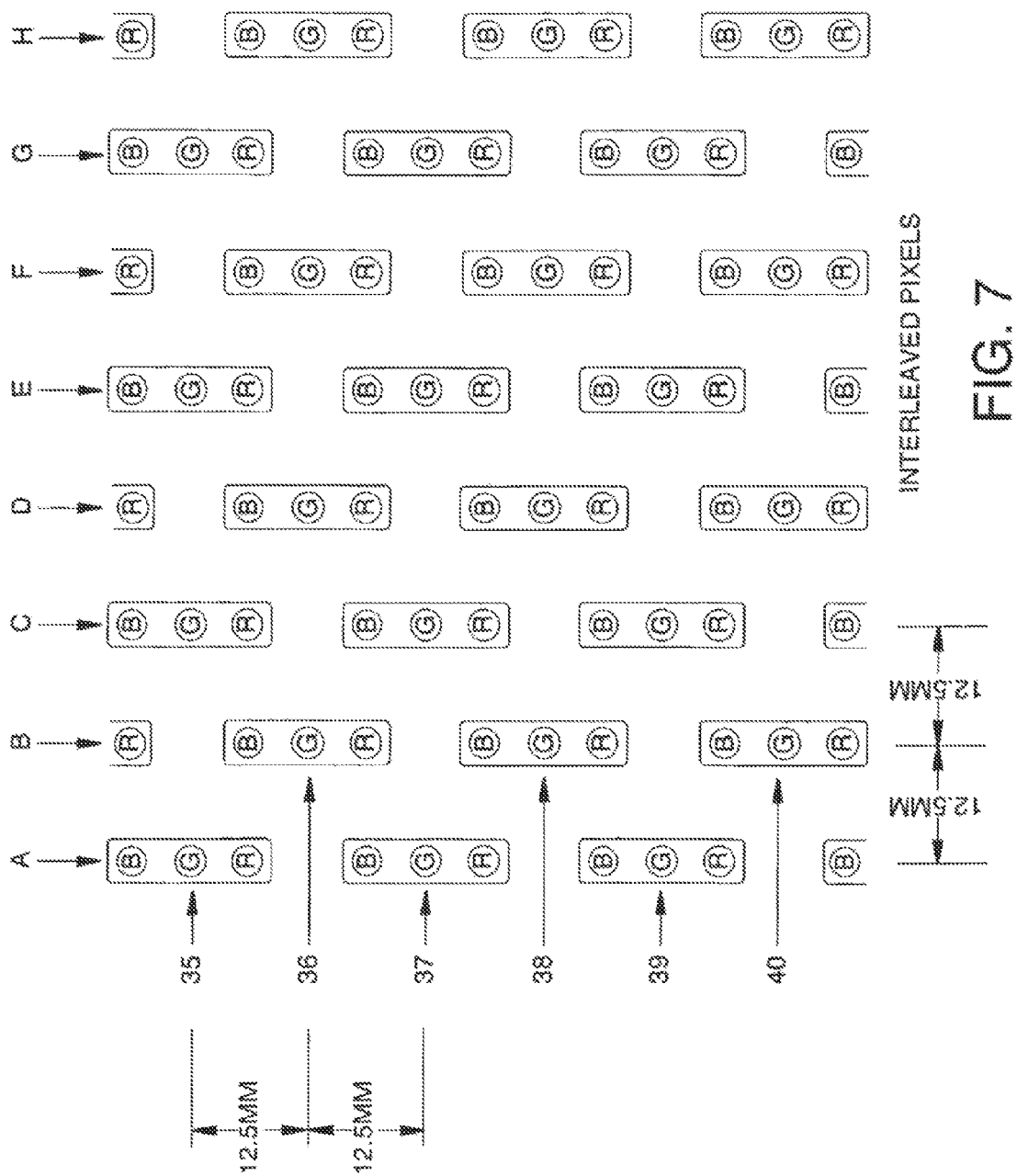
FIG. 7 is an illustration showing interleaving of pixels comprised of individual LEDs such as described and arranged in FIG. 6.

FIG. 7 is an illustration showing interleaving of pixels comprised of individual LEDs, such as described and arranged in FIG. 6. For example, and as in FIG. 6, pixels 35A, 35C, 35E, 35G, 37A, 37C, 37E, 37G, 39A, 39C, 39E, and 39G are distributed with the center of each (a green LED) aligned on vertical and horizontal 12.5 mm centers thus creating pixels spaced at 12.5 mm. A proportionate number of additional pixels 36B, 36D, 36F, 36H, 38B, 38D, 38F, 38H, 40B, 40D, 40F and 40H are interleavingly distributed in uniform fashion substantially between or suitably spaced as illustrated with reference to pixels 35A, 35C, 35E, 35G, 37A, 37C, 37E, 37G, 39A, 39C, 39E, and 39G in alignment with other and additional offset vertical and horizontal 12.5 mm centers resulting in an 12.5 mm spaced interleaved pixel arrangement, where the term "pixel interleaving" or "interleaved" is in preferred use by Daktronics, Inc. of Brookings, S. Dak. More precisely, pixel 36B is centrally located in the space below pixels 35A and 35C and above pixels 37A and 37C, the pixel 38B is centrally located in the space below LED pixels 37A and 37C and above pixels 39A and 39C and so on in a suitable fashion. Other pixels are not shown for the purpose of brevity and clarity. Such an arrangement of pixel results in an interleaved arrangement of pixels with 12.5 mm vertical and horizontal spacing. By using positional pixel processing, the colors blend with their own pixel but the viewer's eyes also blend with the color produced by a neighboring pixel. With this type of interleaved layout, which can also be referred to as "pure pixel", a term which is in preferred use by Daktronics, Inc. of Brookings, S. Dak., each and every pixel and, therefore, each and every scan line is full color resulting in a blend of efficiency and accuracy having the capability to reproduce all the color depth and detail present in the original image signal. For example, a scan of line 35 of FIG. 7 involves the availability of four red LED elements, four green LED elements, and four blue LED elements of the pixels 35A, 35C, 35E and 35G. In a similar fashion, a scan of line 36 involves the availability of four red LED elements, four green LED elements, and four blue LED elements of the pixels 36B, 36D, 36F and 36H. Additional following scan patterns repeatingly exhibit the same characteristics where, preferably, an even and balanced red, green, and blue color representation exists with reference to the scan lines of the interleaved pixel arrangement shown in a manner such as previously described with reference to FIG. 3. It is noted that the interleaved pixel arrangement of FIG. 7, like the "true pixel" arrangement of FIG. 4, includes scan lines of full color representation.

MODE OF OPERATION

Figure 8:
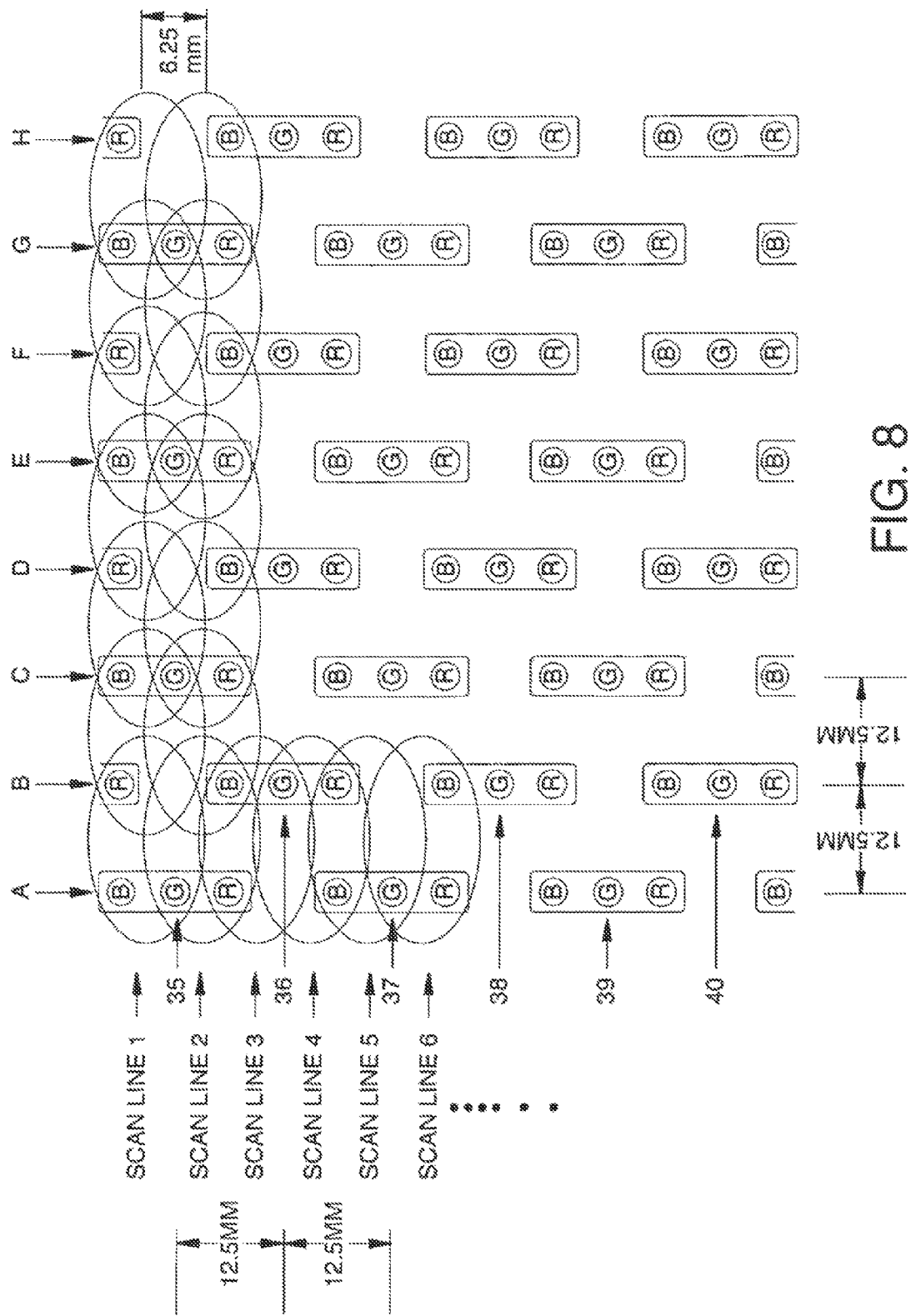
FIG. 8 illustrates resolution enhancement such as offered by interleaving.

FIG. 8 illustrates resolution enhancement such as offered by interleaving, such as shown in FIG. 7. Individual control of red, green, and blue LEDs is exercised over each individual red, green, or blue LED regardless of the native pixel in which each is contained. Such control includes, but is not limited to, operating or not operating the desired colored individual LED and operation of an individual LED at a desired intensity. Individual red, green, and blue LEDs are grouped in real time to increase the perceived line count and overall resolution of a high definition electronic sign display. Such a sub-pixel processing method effectively doubles the native full-color count of the display to deliver smoother curves and greater image detail. Interleaved scanning is used to produce a set of alternating scan lines that are odd or even numbered. Consider scan line 1 (an odd number scan line) and scan line 2 (an even number scan line) during positional pixel processing where the human eye visually and temporally combines LED colors perceived in a 720 line frame. In scan line 1, the colors of a complete group of red green, and blue LEDs are perceived to be located as shown encircled by an ellipse albeit the LEDs reside in different native pixels, i.e., the blue and green LEDs of pixel 35A and the red LED of the partial pixel above pixel 36B are involved. This sequence repeats along scan line 1 and the other odd scan lines where each incremental portion of each scan line includes red, blue and green LEDs. Immediately following a full scan along scan line 1 and all following odd scan lines, another scan along scan line 2, and all following even scan lines, are initiated beginning with the green and red LEDs of pixel 35A and the blue LED of pixel 36B. The very next scan of line 2 proceeds to another complete group of red, green, and blue LEDs involving the blue LED of pixel 36B and the green and red LEDs of pixel 35C. This sequence repeats along scan line 2 where each incremental portion of scan 2 includes red, green, and blue LEDs until completing a full scan of even numbered scan lines. Hence, scan line 1 is painted on using the image information from the scan line 1 of the incoming image, and scan line 2 is painted on with the information from scan line 2 of the incoming image. The shared green LED in this example is imbued with information from both scan line 1 and scan line 2 in relation to the position of this shared green LED. The positional information involves a combination of an interpolated site (weighted average), as well as filters, to remove false color artifacts. Consider scan line 2 and scan line 3, the red and blue LEDs are shared devices on these two lines. The information used to drive these LEDs is a weighted average of the incoming scan lines 2 and 3 with the weighting of the average oriented to the location of these red and blue LEDs. The weighted averaging is performed before transmission of data to the display. To minimize the transmission overhead of the extra information of the shared devices, the green LEDs that are shared on scan lines 1 and 2 are transmitted as part of the information for the blue and red LEDs of scan line 1. The positional image information that is shared on the red and blue devices between scan lines 2 and 3 is transmitted with the information for the green LEDs on scan line 3. This decimation of transmitted data allows for control of the full color scan lines without increasing the transmission bandwidth. Although the pixels are vertically spaced at 12.5 mm each, scan line centers at 6.25 mm spacing where each scan line includes a full compliment of red, green, and blue LEDs as opposed virtual/dynamic pixel arrangements which lack in full color complements for each scan line. Scanning continues in this sequence along the entire frame to achieve 720 scan lines of full red, green, and blue color resolution. Arranging the pixels in interleaving fashion provides spacing which prevents side angle color shift that occurs when LEDs are packed very closely together and creates situations where the plastic lens of LED devices shoulders and blocks the light of other LEDs. The positional pixel processing technology can also be applied to the pixel interleaving configuration 10a shown and described starting in FIG. 1.

Figure 9:
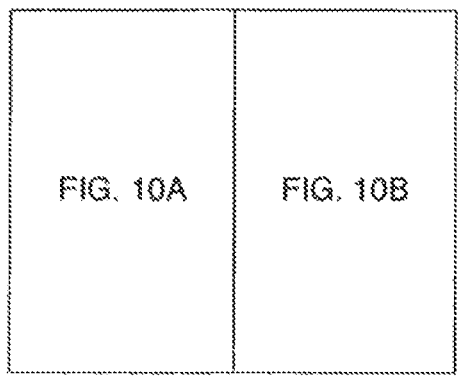
FIG. 9 illustrates the alignment of FIGS. 10A and 10B.
Figure 10A:
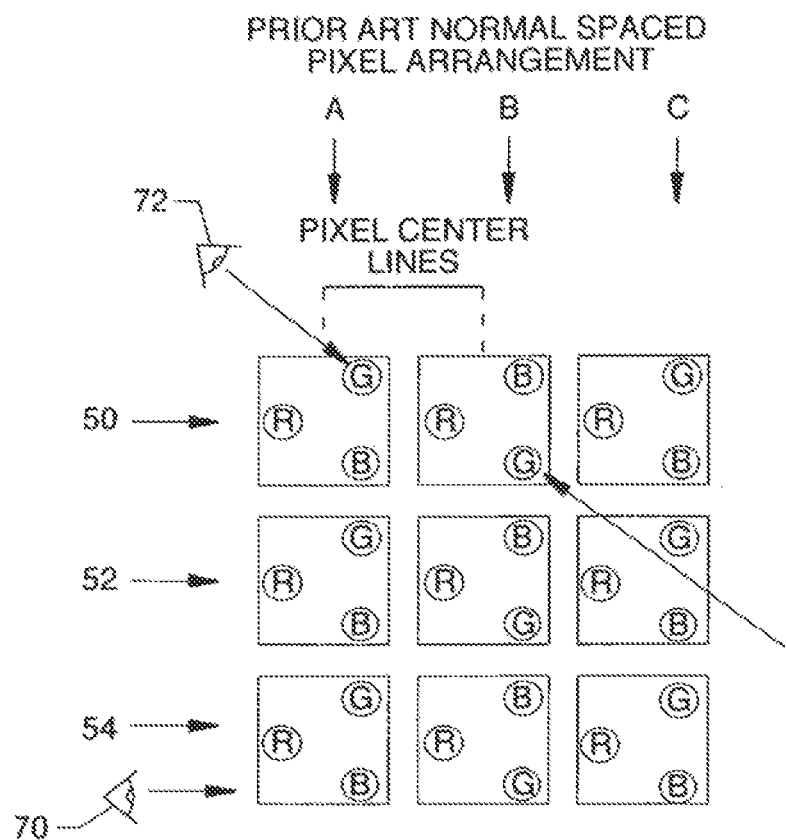
FIGS. 10A and 10B illustrate prior art nominally spaced pixel arrangements and interleaved wide spaced pixel arrangements and unrestricted available LED view path angles.
Figure 10A:
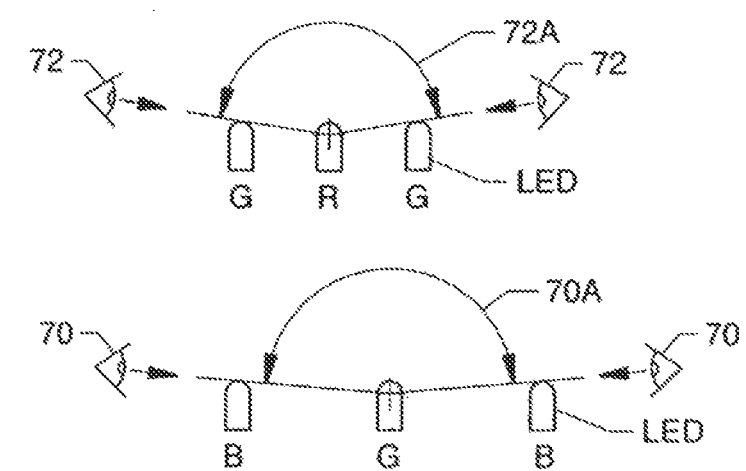
Figure 10B:
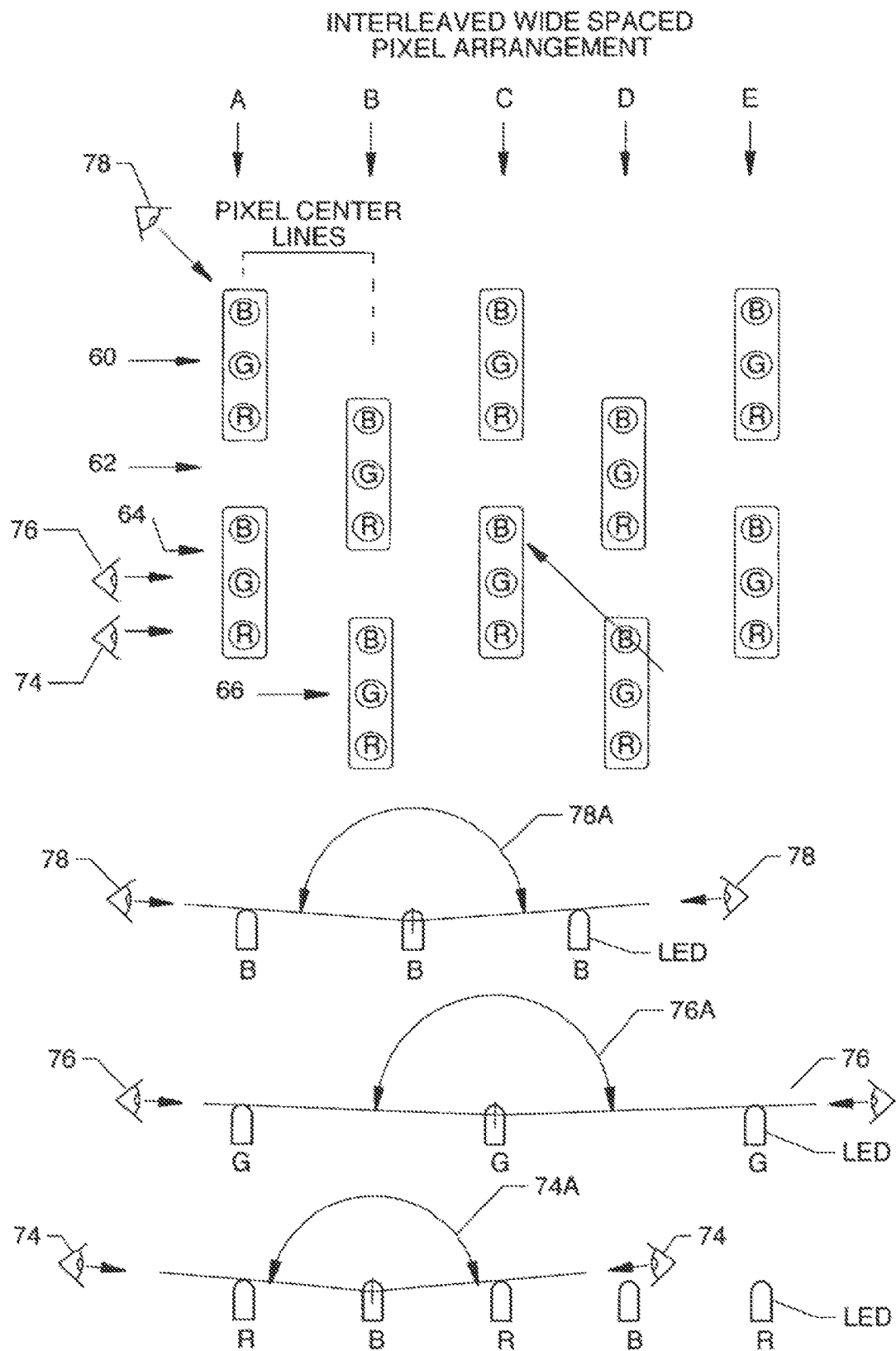

FIG. 9 illustrates the alignment of FIGS. 10A and 10B.

Viewability involving the use of interleaved pixels is also considered where increased viewability is afforded the viewer from viewing positions other than straight-on views by the use of interleaved pixels. Some views which enhance viewability include horizontal side viewing positions from the side and front of the pixels. Other views which enhance viewability are offset downward or upward viewing positions which are angular to and in front of the pixels. Viewability of other than straight-on views is influenced by the spacing between LEDs comprising neighboring pixels where wide spacing between LEDs of neighboring pixels increases viewability. The use of closely arranged pixels of prior art devices somewhat hampers viewability of other than straight-on views because viewing of one LED is blocked by another LED which is in the same line of sight.

FIG. 10A illustrates prior art spaced pixel arrangement as well as side views below showing an unrestricted available LED view path angle, and FIG. 10B illustrates interleaved wide spaced pixel arrangement as well as side views below showing an unrestricted available LED view path angle. The unrestricted available LED view path angle is represented by the included angle from the center point of a middle LED to the curved end of an LED to one side of the middle LED and from the center point of the middle LED to the curved end of an LED to the other side of the middle LED which can be seen unrestricted by a sign observer.

In FIG. 10A, a left offset viewing position 70 is established and displaced to the front and side of the pixels 54A-54C to observe the angular unrestricted available LED view path 70A shown below. The manner of sighting used throughout FIGS. 10A and 10B is typified in an example as follows. The left offset viewing position 70 sights along the blue LED of pixel 54A, the green LED of pixel 54B and the blue LED of pixel 54C, whereby the light emission of the green LED of pixel 54B (middle) is not restricted by the presence of the blue LED of the pixel 54A. The converse would be true if viewed from the right side wherein light emission of the green LED of pixel 54B is not restricted by the presence of the blue LED of the pixel 54C.

In FIG. 10A, a left offset upward viewing position 72 is established and displaced upwardly and to the front and side of the pixels 50A and 50B to observe the angular unrestricted available LED view path 72A, including the green LED of pixel 50A, the red LED of pixel 50B (middle), and the green LED of pixel 50B which are sighted along in the manner previously described.

In FIG. 10B, a left offset viewing position 74 is established and displaced to the front and side of the pixels 64A, 66B, 64C, 66D and 64E to observe the angular unrestricted available LED view path 74A, including the red LED of pixel 64A, the blue LED of pixel 66B (middle), the red LED of pixel 64C, the blue LED of pixel 66D, and the red LED of pixel 66E which are sighted along in the manner previously described.

In FIG. 10B, a left offset viewing position 76 is established and displaced to the front and side of the pixels 64A, 64C and 64E to observe the angular unrestricted available LED view path 76A, including the green LED of pixel 64A, the green LED of pixel 66C (middle), and the green LED of pixel 64E which are sighted along in the manner previously described. In this example, there is not a view restricting LED in columns B or D, whereby the spacing between the respective LEDs is considerably wider than that described in the prior art, thereby providing an unrestricted available LED view path angle 76A greater than and superior to that of the prior art. The unrestricted available LED view path angle 78A can range up to 150°.

In FIG. 10B, a left offset upward viewing position 78 is established and displaced upwardly and to the front and side of the pixels 60A, 62B and 64C to observe the angular unrestricted available LED view path 78A, including the blue LED of pixel 60A, the blue LED of pixel 62B (middle), and the blue LED of pixel 64C which are sighted along in the manner previously described. In this example, the spacing between the respective LEDs is considerably wider than that described in the prior art, thereby providing an unrestricted available LED view path angle 78A greater than and superior to that of the prior art. Providing greater unrestricted available LED view path angles for the interleaved pixels provides better viewability in many respects favoring the use of the wider spaced interleaved pixels over the use of the smaller spaced prior art spaced pixel arrangement. The unrestricted available LED view path angle 78A can range up to 140° or greater.

Various modifications can be made to the present invention without departing from the apparent scope thereof.

It is claimed:

1. An electronic display device, comprising:
a first odd row of LED pixels, a first even row of LED pixels, a second odd row of LED pixels, and a second even row of LED pixels, wherein the first even row of LED pixels is physically interleaved with the first odd row of LED pixels, the second odd row of LED pixels, the second even row of LED pixels is physically interleaved with the second odd row of LED pixels, each LED pixel having one blue LED, one green LED, and one red LED associated therewith;
a first scan line of LED groupings, each LED grouping of the first scan line comprising a blue LED selected from one of the LED pixels of the first odd row or from one of the LED pixels of the first even row, a green LED selected from one of the LED pixels of the first odd row or from one of the LED pixels of the first even row, and a red LED selected from one of the LED pixels of the first odd row or from one of the LED pixels of the first even row;
a second scan line of LED groupings, each LED grouping of the second scan line comprising a blue LED selected from one of the LED pixels of the first even row or from one of the LED pixels of the second odd row, a green LED selected from one of the LED pixels of the first even row or from one of the LED pixels of the second odd row, and a red LED selected from one of the LED pixels of the first even row or from one of the LED pixels of the second odd row; and
a third scan line of LED groupings, each LED grouping of the third scan line comprising a blue LED selected from one of the LED pixels of the first even row or from one of the LED pixels of the second odd row, a green LED selected from one of the LED pixels of the first even row or from one of the LED pixels of the second odd row, and a red LED selected from one of the LED pixels of the first even row or from one of the LED pixels of the second odd row.

2. The electronic display device of claim 1, wherein one of the blue LED, the green LED, and the red LED of each LED grouping of the first scan line is selected from one of the LED pixels of the first odd row and the other two of the blue LED, the green LED, and the red LED of each LED grouping are selected from one of the LED pixels of the first even row.

3. The electronic display device of claim 1, wherein one of the blue LED, the green LED, and the red LED of each LED grouping of the first scan line is selected from one of the LED pixels of the first even row and the other two of the blue LED, the green LED, and the red LED of each LED grouping are selected from one of the LED pixels of the first odd row.

4. The electronic display device of claim 1, wherein one of the blue LED, the green LED, and the red LED of each LED grouping of the second scan line is selected from one of the LED pixels of the first even row and the other two of the blue LED, the green LED, and the red LED of each LED grouping are selected from one of the LED pixels of the second odd row.

5. The electronic display device of claim 1, wherein one of the blue LED, the green LED, and the red LED of each LED grouping of the second scan line is selected from one of the LED pixels of the second odd row and the other two of the blue LED, the green LED, and the red LED of each LED grouping are selected from one of the LED pixels of the first even row.

6. The electronic display of claim 1, further comprising a fourth scan line of LED groupings, each LED grouping of the fourth scan line comprising a blue LED selected from one of the LED pixels of the second odd row or from one of the LED pixels of the second even row, a green LED selected from one of the LED pixels of the second odd row or from one of the LED pixels of the second even row, and a red LED selected from one of the LED pixels of the second odd row or from one of the LED pixels of the second even row.

7. The electronic display of claim 6, further comprising a fifth scan line of LED groupings, each LED grouping of the fifth scan line comprising a blue LED selected from one of the LED pixels of the second odd row or from one of the LED pixels of the second even row, a green LED selected from one of the LED pixels of the second odd row or from one of the LED pixels of the second even row, and a red LED selected from one of the LED pixels of the second odd row or from one of the LED pixels of the second even row.

8. The electronic display of claim 6, further comprising a third odd row of LED pixels physically interleaved with the second even row of LED pixels, each of the LED pixels of the third odd row having one blue LED, one green LED, and one red LED associated therewith.

9. The electronic display of claim 8, further comprising a sixth scan line of LED groupings, each LED grouping of the sixth scan line comprising a blue LED selected from one of the LED pixels of the second even row or from one of the LED pixels of the third odd row, a green LED selected from one of the LED pixels of the second even row or from one of the LED pixels of the third odd row, and a red LED selected from one of the LED pixels of the second even row or from one of the LED pixels of the third odd row.

10. The electronic display of claim 1, wherein adjacent LEDs are horizontally spaced about 12.5 mm on center.

11. The electronic display of claim 1, wherein the first odd row, the first even row, and the second odd row extend in a generally horizontal direction.

12. The electronic display of claim 11, wherein the first scan line and the second scan line are vertically spaced about 6.25 mm on center.

13. The electronic display of claim 1, wherein the first odd row, the first even row, and the second odd row extend in a generally vertical direction.

14. The electronic display of claim 13, wherein the first scan line and the second scan line are horizontally spaced about 6.25 mm on center.

15. A method of operating an electronic display device, the method comprising:
  providing or receiving at least a first odd row, a first even row, a second odd row, and a second even row of LED pixels, wherein the first even row of LED pixels is physically interleaved with the first odd row and the second odd row of LED pixels and the second even row is physically interleaved with the second odd row, each LED pixel having one blue LED, one green LED, and one red LED associated therewith; and
  individually controlling each of a plurality of LED groupings, including a blue LED, a green LED, and a red LED selected from adjacent even and odd rows, to form a first scan line by controlling LEDs from the first odd row and the first even row, a second scan line by controlling LEDs from the first even row and the second odd row, and a third scan line by controlling LEDs from the second odd row and the second even row.

16. The method of claim 15, further comprising interleaving scanning of the first and second scan lines.

\* \* \* \* \*